US008185298B2

(12) United States Patent
Jha et al.

(10) Patent No.: US 8,185,298 B2
(45) Date of Patent: May 22, 2012

(54) HYBRID HEURISTIC NATIONAL AIRSPACE FLIGHT PATH OPTIMIZATION

(75) Inventors: Pratik D. Jha, Herndon, VA (US); Alexander Suchkov, Sterling, VA (US); Rajesh Venkat Subbu, Clifton Park, NY (US); John Michael Lizzi, Wilton, NY (US); Jingqiao Zhang, Troy, NY (US); Ian Crook, Paris (FR); Abderrazak Tibichte, Charenton le Pont (FR)

(73) Assignee: Lockheed Martin Corporation, Bethesda, MD (US)

( * ) Notice: Subject to any disclaimer, the term of this patent is extended or adjusted under 35 U.S.C. 154(b) by 804 days.

(21) Appl. No.: 12/253,690

(22) Filed: Oct. 17, 2008

(65) Prior Publication Data

US 2009/0105935 A1 Apr. 23, 2009

Related U.S. Application Data

(60) Provisional application No. 60/980,716, filed on Oct. 17, 2007.

(51) Int. Cl.
*G06F 19/00* (2011.01)
*G06G 7/70* (2006.01)
*G06G 7/76* (2006.01)

(52) U.S. Cl. .................................................. 701/121

(58) Field of Classification Search .................. 701/120, 701/121, 122, 209, 210
See application file for complete search history.

(56) References Cited

U.S. PATENT DOCUMENTS

| | | | | |
|---|---|---|---|---|
| 4,947,350 | A | 8/1990 | Murray et al. | |
| 5,222,192 | A | 6/1993 | Shaefer | |
| 5,255,345 | A | 10/1993 | Shaefer | |
| 5,272,638 | A | 12/1993 | Martin et al. | |
| 5,408,413 | A | 4/1995 | Gonser et al. | |
| 5,559,707 | A | 9/1996 | DeLorme et al. | |
| 5,623,413 | A | 4/1997 | Matheson et al. | |
| 5,850,617 | A | 12/1998 | Libby | |
| 5,897,629 | A | 4/1999 | Shinagawa et al. | |
| 5,961,568 | A | 10/1999 | Farahat | |
| 6,085,147 | A | 7/2000 | Myers | |
| 6,134,500 | A | 10/2000 | Tang et al. | |
| 6,161,097 | A | 12/2000 | Glass et al. | |
| 6,253,147 | B1 | 6/2001 | Greenstein | |
| 6,289,277 | B1 | 9/2001 | Feyereisen et al. | |
| 6,314,361 | B1 | 11/2001 | Yu et al. | |
| 6,314,362 | B1 | 11/2001 | Erzberger et al. | |
| 6,393,358 | B1 * | 5/2002 | Erzberger et al. | 701/120 |
| 6,418,398 | B1 | 7/2002 | Dueck et al. | |

(Continued)

OTHER PUBLICATIONS

Daniel, Delahaye, et al. "Airspace Congestion Smoothing by Multi-objective Genetic Algorithm" ACM Symposium on Applied Computing (2005).*

(Continued)

*Primary Examiner* — Mary Cheung
*Assistant Examiner* — Kyle K Tsui
(74) *Attorney, Agent, or Firm* — Marsh Fischmann & Breyfogle LLP

(57) ABSTRACT

Hybrid-heuristic optimization of competing portfolios of flight paths for flights through one or more sectors of an airspace represented by an air traffic system. In one embodiment, a hybrid-heuristic optimization process (100) includes one or more heuristic based processes (110), a genetic optimization process (120), an evaluation process involving an approximation model (130), an optimal portfolio selection process (140) and a validation process involving simulation (150) of the air traffic system.

16 Claims, 6 Drawing Sheets

U.S. PATENT DOCUMENTS

| | | | | |
|---|---|---|---|---|
| 6,463,383 | B1 | 10/2002 | Baiada et al. | |
| 6,529,821 | B2 | 3/2003 | Tomasi et al. | |
| 6,604,044 | B1 | 8/2003 | Kirk | |
| 6,606,553 | B2 | 8/2003 | Zobell et al. | |
| 6,711,548 | B1 | 3/2004 | Rosenblatt | |
| 6,789,011 | B2 | 9/2004 | Baiada et al. | |
| 6,856,864 | B1 | 2/2005 | Gibbs et al. | |
| 6,904,421 | B2 | 6/2005 | Shetty | |
| 7,072,765 | B2 | 7/2006 | Schmidt et al. | |
| 7,076,409 | B2 | 7/2006 | Agrawala et al. | |
| 7,240,038 | B2 | 7/2007 | Hitt | |
| 7,246,075 | B1 | 7/2007 | Testa | |
| 7,664,596 | B2 * | 2/2010 | Wise et al. | 701/120 |
| 2002/0069015 | A1 | 6/2002 | Fox et al. | |
| 2003/0055540 | A1 | 3/2003 | Hansen | |
| 2003/0084011 | A1 | 5/2003 | Shetty | |
| 2003/0093219 | A1 | 5/2003 | Schultz et al. | |
| 2003/0167109 | A1 | 9/2003 | Clarke et al. | |
| 2004/0073341 | A1 | 4/2004 | Moitra et al. | |
| 2004/0193362 | A1 | 9/2004 | Baiada et al. | |
| 2005/0071206 | A1 * | 3/2005 | Berge | 705/6 |
| 2005/0143845 | A1 | 6/2005 | Kaji | |
| 2005/0216182 | A1 | 9/2005 | Hussain et al. | |
| 2006/0089760 | A1 | 4/2006 | Love et al. | |
| 2006/0212279 | A1 | 9/2006 | Goldberg et al. | |
| 2007/0005550 | A1 | 1/2007 | Klein | |
| 2007/0208677 | A1 * | 9/2007 | Goldberg et al. | 706/13 |

OTHER PUBLICATIONS

Nilim, A. and Ei Ghaoui, L. Algorithms for Air Traffic Flow Management under Stochastic Environments. Proceedings of the IEEE American Control Conference. 4 pages. 2004.

Davidson, G. et al. Strategic Traffic Flow Management Concept of Operations. Proceedings of the AIAA Aviation Technology, Integration, and Operations Conference. Chicago, IL. 10 pages. Sep. 2004.

Delahaye, D. et al. Airspace Congestion Smoothing by Multi-objective Genetic Algorithm. Proceedings of the ACM Symposium on Applied Computing. pp. 907-912. 2005.

D' Aspremont, A. and Ei Ghaoui, L. A Semidefinite Relaxation for Air Traffic Flow Scheduling. Proceedings of the IEEE Research, Innovation, and Vision for the Future Conference. pp. 1-8. Sep. 26, 2006.

Bayen, A.M. et al. Lagrangian Delay Predictive Model for Sector-Based Air Traffic Flow. AIAA Journal of Guidance, Control, and Dynamics. vol. 8, No. 5. pp. 1-34. 2004.

Mulgund, S. et al. A Genetic Algorithm Approach to Probabilistic Airspace Congestion Management. Proceedings of the AIAA Guidance, Navigation, and Control Conference. Keystone, Colorado. pp. 1-17. Aug. 21-24, 2006.

Sun, D. et al. Eulerian Trilogy. Proceedings of the AIAA Guidance, Navigation, and Control Conference. Keystone, Colorado. pp. 1-20. Aug. 21-24, 2006.

Krozel J. et al. Aggregate Statistics of the National Airspace System. Proceedings of the AIAA Guidance, Navigation, and Control Conference. Austin, Texas. pp. 1-15. Aug. 2003.

Leal De Matos, P. et al. Optimisation models for Re-routing Air Traffic Flows in Europe. Journal of the Operational Research Society. vol. 52, No. 12. pp. 1338-1349. Dec. 2001.

Bertsimas, D. and Patterson, S.S. The Air Traffic Flow Management Problem with Enroute Capacities. Journal of the Operational Research Society. vol. 46, No. 3. May-Jun. 1998.

Bonissone, P.P. et al. Evolutionary Algorithms + Domain Knowledge=Real-World Evolutionary Computation. IEEE Transactions on Evolutionary Computation. vol. 10, No. 3. pp. 256-280. Jun. 2006.

Crook, I. et al. The Common ATM Information State Space-A unified data management system for the entire NAS resources based on an indexing system. ATM. Santa Fe. 9 pages. 2001.

Bichot, C-E. and Durand, N. A Tool to Design Functional Airspace Blocks. Proceedings of the 7th USA/Europe Air Traffic Management Seminar. pp. 1-9. Jul. 2, 2007.

Ostwald, P. et al. The Miles-in-Trail Impact Assessment Capability. Proceedings of the Aviation Technology, Integration and Operations Conference. Wichita, Kansas. pp. 1-14. Sep. 25-27, 2006.

Masalonis, A.J. et al. Dynamic Density and Complexity Metrics for Realtime Traffic Flow Management. The MITRE Corporation. pp. 1-10. 2003.

Ramamoorthy, K. et al. Modeling and Performance of NAS in Inclement Weather. Proceedings of the AIAA Aviation Technology, Integration and Operations Conference. Wichita, Kansas. pp. 1-14. Sep. 25-27, 2006.

Fellman, L. and Topiwala, T. ARTCC-Initiated Rerouting. Proceedings of the AIAA Aviation Technology, Integration and Operations Conference. Wichita, Kansas. pp. 1-14. Sep. 25-27, 2006.

Jha, P.D. et al. Automated Planning for the Next Generation Air Transportation System (NGATS): Challenges and Formulation. Air Traffic Control Association Conference. Washington D.C. pp. 1-8. Oct. 29-Nov. 1, 2006.

Erzberger, H. The Automated Airspace Concept. Proceedings of the 4th USA/Europe Air Traffic Management R&D Seminar. Santa Fe, New Mexico. pp. 1-16. Dec. 3-7, 2001.

Bayen, A.M. et al. A Control Theoretic Predictive Model for Sector-based Air Traffic Flow. Proceedings fo the AIAA GNC Conference. Monterey, California. pp. 1-11. Aug. 5-8, 2002.

Sridhar, B. et al. Airspace Complexity and its Application in Air Traffic Management. Proceedings of the 2nd USA/Europe Air Traffic Management R&D Seminar. Orlando, Florida. pp. 1-9. Dec. 1-4, 1998.

Gianazza, D. and Alliot, J-M. Optimisation of Air Traffic Control Sector Configurations using Tree Search Methods and Genetic Algorithms. Proceedings of the 21st Digital Avionics Systems Conference. vol. 1. pp. 2.A.5-1-2.A.5-8. Oct. 27-31, 2002.

Oussedik, S. et al. Dynamic Air Traffic Planning by Genetic Algorithms. Proceedings of the IEEE Congress on Evolutionary Computation. vol. 2. pp. 1110-1117. 1999.

Cheng, V.H.L. et al. Air Traffic Control Using Genetic Search Techniques. Proceedings of the IEEE International Conference on Control Applications. Kohula Coast, Hawaii. pp. 249-254. Aug. 22-27, 1999.

Gotteland, J-B. and Durand, N.. Genetic Algorithms Applied to Airport Ground Traffic Optimization. Proceedings of the IEEE Congress on Evolutionary Computation. vol. 1. pp. 544-551. 2003.

Hutchison, D.W. and Hill, S.D. Simulation Optimization of Airline Delay with Constraints. Proceedings of the Winter Simulation Conference. vol. 2. pp. 1017-1022.

Eurocontrol. Air Traffic Flow & Capacity Management Strategy. European Organisation for the Safety of Air Navigation. Edition 1.2. Released Jan. 4, 2004.

Eurocontrol. General & CFMU Systems. Edition No. 12.0. http://www.cfmu.eurocontrol.int. Amended Jan. 22, 2008 and Jul. 25, 2006.

Haraldsdottir, et al. "Air Traffic Management Capacity-Driven Operational Concept through 2015." In: 2nd USA/Europe Air Traffic Managment R&D Seminar [online], Dec. 1-4, 1998.

Daniel, et al., "Airspace Congestion Smoothing by Multi-objective Genetic Algorithm" ACM Symposium on Applied Computing (2005), SESSION: Evolutionary computation and optimization (ECO).

Patent Cooperation Treaty International Preliminary Report on Patentability (Chapter I of the Patent Cooperation Treaty). International Application No. PCT/US2008/080344. International Filing Date: Oct. 17, 2008 Mail Date: Apr. 49, 2010.

* cited by examiner

| | | | | | | | | | |
|---|---|---|---|---|---|---|---|---|---|
| 1 | 1 | 1 | 0 | 1 | 2 | 2 | 2 | 1 | 1 |

| | |
|---|---|
| 2 | 3 |

| | |
|---|---|
| 1 | 2 |

HYBRID HEURISTIC NATIONAL AIRSPACE FLIGHT PATH OPTIMIZATION

RELATED APPLICATION INFORMATION

This application claims priority from U.S. Provisional Application Ser. No. 60/980,716, entitled "HYBRID HEURISTIC NATIONAL AIRSPACE FLIGHT PATH OPTIMIZATION" filed on Oct. 17, 2007, which is incorporated by reference herein in its entirety.

FIELD OF THE INVENTION

The present invention relates generally to optimization problems, and more particularly to optimizing competing portfolios of requested flight path routes for flights within an airspace during a time period.

BACKGROUND OF THE INVENTION

The Federal Aviation Administration's (FAA's), joint industry-government initiative—the Joint Program Development Office (JPDO)—is responsible for charting the Next Generation Air Transportation System (NextGen). One of the strategic objectives outlined in the JPDO's operational concept is to ensure that flight operator objectives are balanced with overall NAS performance objectives. To ensure that this objective is met a process called Flow Contingency Management (FCM) has been proposed. The FCM process aims to alleviate the demand capacity imbalance that could originate as a result of excessive demand for a particular airspace or reduced capacity because of operational constraints in a manner that is equitable across multiple stakeholders.

The FAA in its Operational Evolution Partnership (OEP) emphasizes the need for major improvement in collaborative air traffic management (CATM) process. OEP highlights that NextGen CATM philosophy should be driven to accommodate flight operator preferences to the maximum extent possible and to impose restrictions only when a real operational need exists to meet the demand. Furthermore in case the constraints are required, the goal should be to maximize the operators' opportunities to resolve them based on their own preferences.

The OEP outlines that NextGen CATM system should be interactive and iterative and flight operators should be able to interact with a set of flow planning services to manage their operations. The flow planning services will provide a trajectory analysis capability so that flight plans can be mapped against the available resources for compatibility analysis. In addition, through the flow planning services, a common set of flow strategies will be shared with all the stakeholders to promote a common situational awareness of the NAS operating plan.

Steadily increasing traffic densities have motivated the use of automation to alleviate controller workload and increase sector capacities. The "Automated Airspace," is described as a concept wherein automated flight separation command and control is proposed as a powerful means to decrease controller workload and thereby increase sector capacity. The role of aircraft-to-aircraft separation as a key traffic flow and congestion management control parameter has been highlighted. In current traffic flow management practice, aircraft-to-aircraft separation (miles-in-trail) is a widely used strategy for managing congestion and workload. There is limited capability to assess the consequences of these actions, and controllers must rely primarily on experience to assess if their miles-in-trail actions will have desired impacts on traffic flow demands. In response to this need a miles-in-trail impact assessment simulation system capability was developed by MITRE.

Traffic controllers work at the level of sectors. The aggregate-level consisting of several sectors is called a center. Efficient forecasting of traffic flows and congestion at the center-level is important to anticipate and adapt to changing situations. Simulation-based—such as the Reorganized Air Traffic Control Mathematical Simulator (RAMS Plus) gate-to-gate simulator—or model-based methods have therefore evolved to support this need. Control theoretic models that consider the impact of tactical air traffic control actions on traffic flows have also been developed. Such a model may be used to augment simulation-based methods. Simulation-based methods typically have the resources to include multiple specialized fine-grained and coarse-grained hybrid models, each for a given NAS resource, to assess the aggregate impact of traffic flow and air traffic control strategy performance, and therefore tend to be more realistic in assumptions and overall behavior.

Moderate to severe weather patterns have a principal effect on the efficiency of NAS operations. Due to the complex nature of the probabilistic influence of weather on traffic flows, simulation has been pursued as a method to assess system performance impacts. In current practice, rerouting around expected weather patterns is typically utilized as a principal traffic flow management strategy. In research carried out relating to stochasticity in traffic flow management, dynamic tactical reactive rerouting strategies for aircraft under probabilistic weather influence assumptions are considered. Longer-term anticipatory rerouting allows a greater degree of planning freedom than shorter-term reactive tactical rerouting. Given that efficient anticipatory rerouting requires reliable weather forecasts, and given significant inherent uncertainties in the weather forecasts themselves, efforts have been invested to accommodate and manage forecast variance in traffic flow decision-making.

A number of optimization-based planning methods and tools have been developed for traffic flow management. Airspace configurations and traffic patterns have a principal effect on controller workload and efficiency. An airspace sector aggregation or partitioning meta-heuristic algorithm for European skies having the potential to improve safety by reducing controller workload has been proposed. "Airspace Complexity" is a term that has been proposed to capture the influence that airspace configurations and traffic flow patterns have on controller workload and efficiency. However, this relationship is complex, and planning tools that operate in this environment must be able to accommodate nonlinearities, continuous and discrete variables, and high-dimensional search. Therefore, stochastic optimization methods such as evolutionary or genetic algorithms have been applied for planning and decision-support at multiple levels: at the sector configuration level; at the route and departure time planning levels through; and at the airport ground operations level.

Heuristic and mathematical programming-based techniques have also been proposed for solving several aspects of traffic flow management. In general though, mathematical programming approaches tend to make simplifying assumptions of the nature of the traffic flow behavior and management action options in order to accommodate solutions within tractable parametric search spaces. They also tend to work off a baseline simulation assessment, and do not include a realistic simulation in the optimization stage, as the problem formulation is used as a proxy for the airspace simulation. In addition, these techniques typically result in a single final solution, which if found unacceptable for any reason would necessitate computationally expensive solution regeneration.

The U.S. National Airspace accommodates over 50,000 flights daily. During an operational day, paths for upcoming flights within a time horizon are filed by the various Airline Operators (AOC) with the Air Traffic Control System Command Center (ATCSCC). Once the AOCs have generated a flight path option for a particular flight they submit it to the ATCSCC. However, since the AOC planning is done significantly in advance, and the predictability of weather is low much in advance of departure, there needs to be flexibility to manage uncertainty and meet AOC business objectives. Theoretically, an AOC can wait until the last minute to file the flight plan, but in practice an AOC has numerous flight plans to process, so they must continue to file flight plans in order to manage their workload. In case weather does not pose a problem the AOC should get the best possible route. In case weather does pose a problem the AOC should be able to settle for their second choice. So to respond to the inherent uncertainty, an AOC does the trial planning process iteratively and prepares a list of options that meets their goals. The AOC consequently files a flight plan that has multiple flight path options ranked in order of preference.

SUMMARY OF THE INVENTION

Accordingly, the present invention provides a novel hybrid heuristic method and system for fast large-scale optimization of flight route combinations from those filed by the various AOCs within an operational horizon (e.g. a twenty-four hour period). Such method and system is able to replan/reoptimize very quickly and up until the point of departure should weather forecasts change considerably from the filing of the flight route options by the AOCs. Such method and system may incorporate a realistic air traffic simulator in the loop for highly reliable predictive optimization. Such method and system may include top-down and bottom-up heuristics combined with genetic algorithms and a realistic air traffic simulation in the loop to select a portfolio of flight paths that has multiple desirable performance characteristics such as, for example, low total congestion and low total flight miles.

Heuristics based methodologies may be used to provide both upfront complexity reduction and optimization. Specifically, heuristics are able to leverage domain knowledge and problem-specific strategies for superior problem solving. The heuristic method the present inventors have developed leverages advanced fast-time computational geometry capabilities described above and associated components to identify optimal flight paths.

One heuristic-based method utilizes a bottom-up approach, starting with an empty representation of the airspace, and then plans flights, on a first come, first served basis. One or more path options are provided for each flight. It may be assumed that the path options are provided in the order of preference with the first option being the preferred one. Flights are given their first option until a demand capacity imbalance is calculated utilizing the air traffic system approximation described above. Once this imbalance is found, additional path options for flights are evaluated until either balance is recovered or there are no remaining options.

Another heuristic method utilizes a top-down approach starting with a representation of the future airspace, and incrementally removes demand capacity imbalances. The algorithm, given a projection of demand, first identifies problematic sector-time periods. Problem flights are then identified as flights that fly through the predefined problematic sector-time periods and are selected for re-planning. Flight options for each problematic flight are evaluated and selected based upon their contribution to the identified demand capacity imbalance.

Following application of heuristics such as described above, an evolutionary algorithm (genetic algorithm) may be utilized in a solution tuning and refinement step. This hybrid approach uses heuristics as a key problem complexity reduction step for the evolutionary search. An added benefit of the heuristic approach is that stakeholder preferences may be easily incorporated in the problem-solving process, resulting in solutions agreeable to stakeholders. The genetic algorithm may also be utilized at the meta level to search in the space of heuristic strategies, and as such makes for a very powerful and expansive search capability.

In one aspect, a method for optimizing a plurality of competing portfolios of flight paths for flights through one or more sectors of an airspace represented by an air traffic system includes executing at least one heuristic-based process to construct successive portfolios of the flight paths for consideration, wherein the at least one heuristic-based process includes one or more configurable parameters that are applied in selecting the successive portfolios. The method may also include applying a genetic optimization process to identify the at least one heuristic-based process according to its one or more configurable parameters. The method may further include evaluating each successive portfolio constructed by the at least one heuristic-based process with an approximation model that approximates the air traffic system. The method may additionally include selecting an optimal portfolio of the flight paths from among the plurality of competing portfolios of flight paths based on results of said evaluating step. The method may also include utilizing a simulation of the air traffic system to validate the optimal portfolio of flight paths selected in the selecting step.

In another aspect, a system that optimizes a plurality of competing portfolios of flight paths for flights through one or more sectors of an airspace represented by an air traffic system includes at least one heuristic-based filter that constructs successive portfolios of the flight paths for consideration, wherein the at least one heuristic-based filter includes one or more configurable parameters that are applied in selecting the successive portfolios. The system may also include a genetic optimizer that identifies the at least one heuristic-based filter according to its one or more configurable parameters. The system may further include an approximation model of the air traffic system that is usable to evaluate each successive portfolio constructed by the at least one heuristic-based filter, wherein results of the evaluations of each successive portfolio by the approximation model are used to select an optimal portfolio of the flight paths from among the plurality of competing portfolios of flight paths. The system may additionally include a simulation of the air traffic system usable to validate the optimal portfolio of flight paths selected in accordance with results of the evaluations of each successive portfolio by the approximation model.

In a further aspect, an approximation model of an air traffic simulation system representing an airspace that is usable in a method or system that optimizes competing portfolios of flight paths for flights through one or more sectors of the airspace represented by the air traffic system includes a fine-grained demand matrix and a coarse-grained demand matrix. The fine-grained demand matrix may be generated directly from a four-dimensional traffic information set including information about which sectors of the airspace are crossed during which of a plurality of first time periods for selected flight paths of the flights included in a competing portfolio of flight paths, wherein the fine-grained demand matrix comprises a two-dimensional matrix having rows or columns corresponding to the sectors of the airspace and columns or rows corresponding to first time periods with numerical elements indicating the total number of the flights that cross each sector during each of the first time periods. The coarse-grained demand matrix may comprise a two-dimensional matrix having rows or columns corresponding to the sectors of the airspace and columns or rows corresponding to second time periods with numerical elements representing an amount of the flights that cross each sector during each of the second time periods, wherein each second time period comprises an aggregate of more than one of the first time periods.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
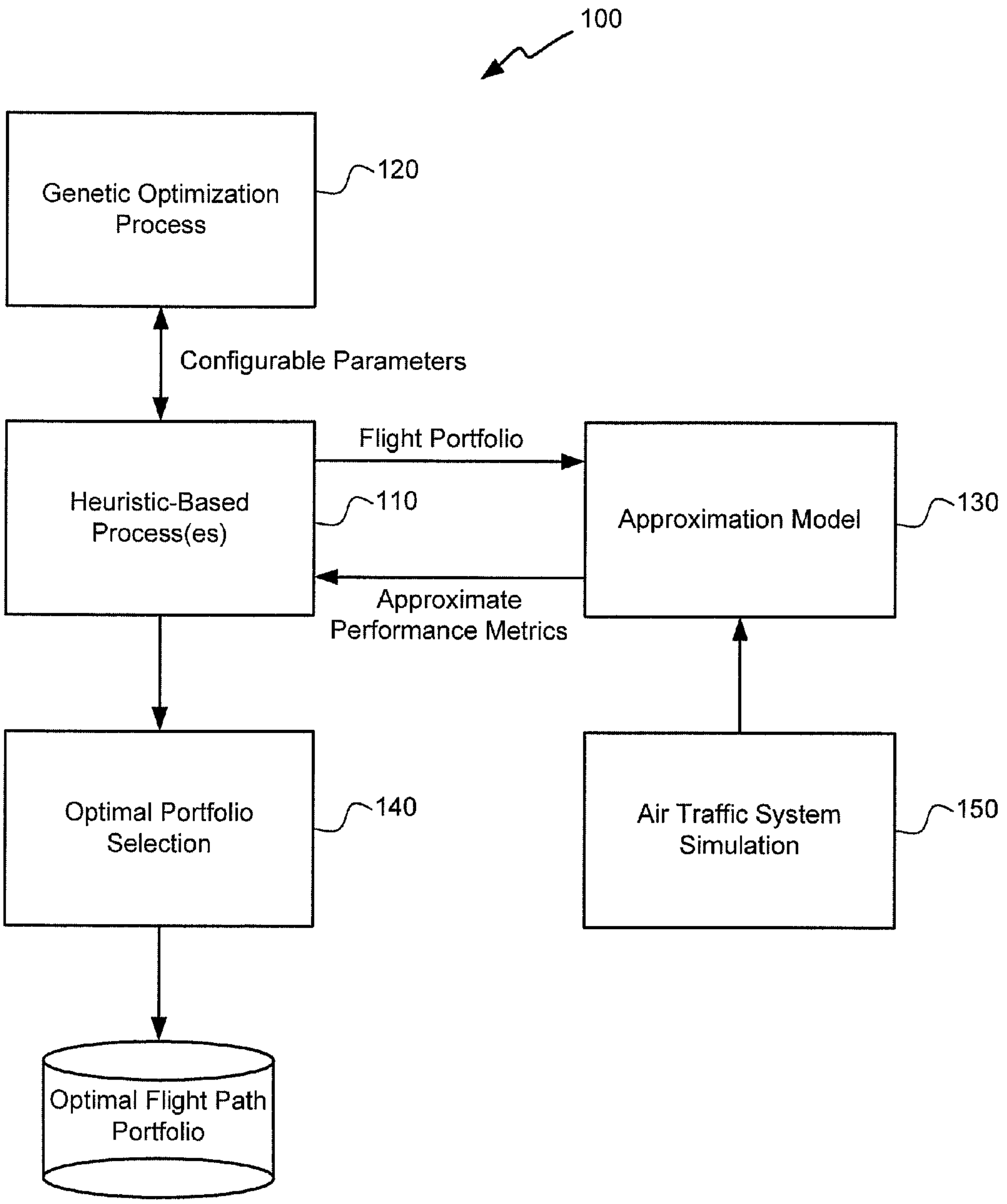
FIG. 1 is a schematic representation of one embodiment of a hybrid-heuristic optimization process in accordance with the present invention.

FIG. 1 shows one embodiment of a hybrid-heuristic optimization process 100 that optimizes competing portfolios of flight paths for flights through one or more sectors of an airspace. The airspace may be represented by an air traffic system such as, for example, as a collection of dynamic sector-time periods, with each sector-time period representing a three-dimensional volume of the airspace during a given period of time within an operational horizon.

In accordance with the hybrid-heuristic optimization process 100, a number of process operations are undertaken including one or more heuristic based processes 110, a genetic optimization process 120, an evaluation process involving an approximation model 130, an optimal portfolio selection process 140, and a validation process involving simulation 150 of the air traffic system. Each heuristic-based process 110 is executed to construct successive portfolios of the flight paths for consideration as possible optimal portfolios. In this regard, each heuristic-based process 110 includes one or more configurable parameters that are applied in selecting the successive portfolios. Each successive portfolio constructed by the one or more heuristic-based processes 110 is evaluated with the approximation model 130 that approximates the air traffic system. The optimal portfolio selection process 140 selects an optimal portfolio of the flight paths from among the plurality of competing portfolios of flight paths based on results of the evaluation by the approximation model 130. The air traffic system simulation 150 may then be used to validate the optimal portfolio of flight paths selected in the optimal portfolio selection process 140. In this regard, the air traffic simulation 150 that is employed may, for example, be the Common ATM Information State Space (CAISS) simulator. While desirable, validation by the air traffic system simulation 150 (e.g., CAISS) may not be necessary in all embodiments of the hybrid-heuristic optimization process 100.

While the one or more heuristic-based processes 110 are being executed, the genetic optimization process 120 and evaluation by the approximation model 130 may be occurring in conjunction with the one or more heuristic-based processes 110. In this regard, the genetic optimization process 120 is applied to identify the one or more heuristic-based processes 110 according to their one or more configurable parameters. The one or more configurable parameters may include a heuristic-type (e.g., top-down or bottom-up) and one or more threshold parameters (e.g., a congestion threshold).

In executing the one or more heuristic-based processes 110, a number of heuristic methodologies may be executed to construct the successive portfolios of the flight paths for consideration as possible optimal portfolios. Two exemplary heuristic-based methods include a bottom-up method and a top-down method. In one embodiment of the hybrid-heuristic optimization process 100, both bottom-up and top-down heuristic methods are executed.

Figure 2:
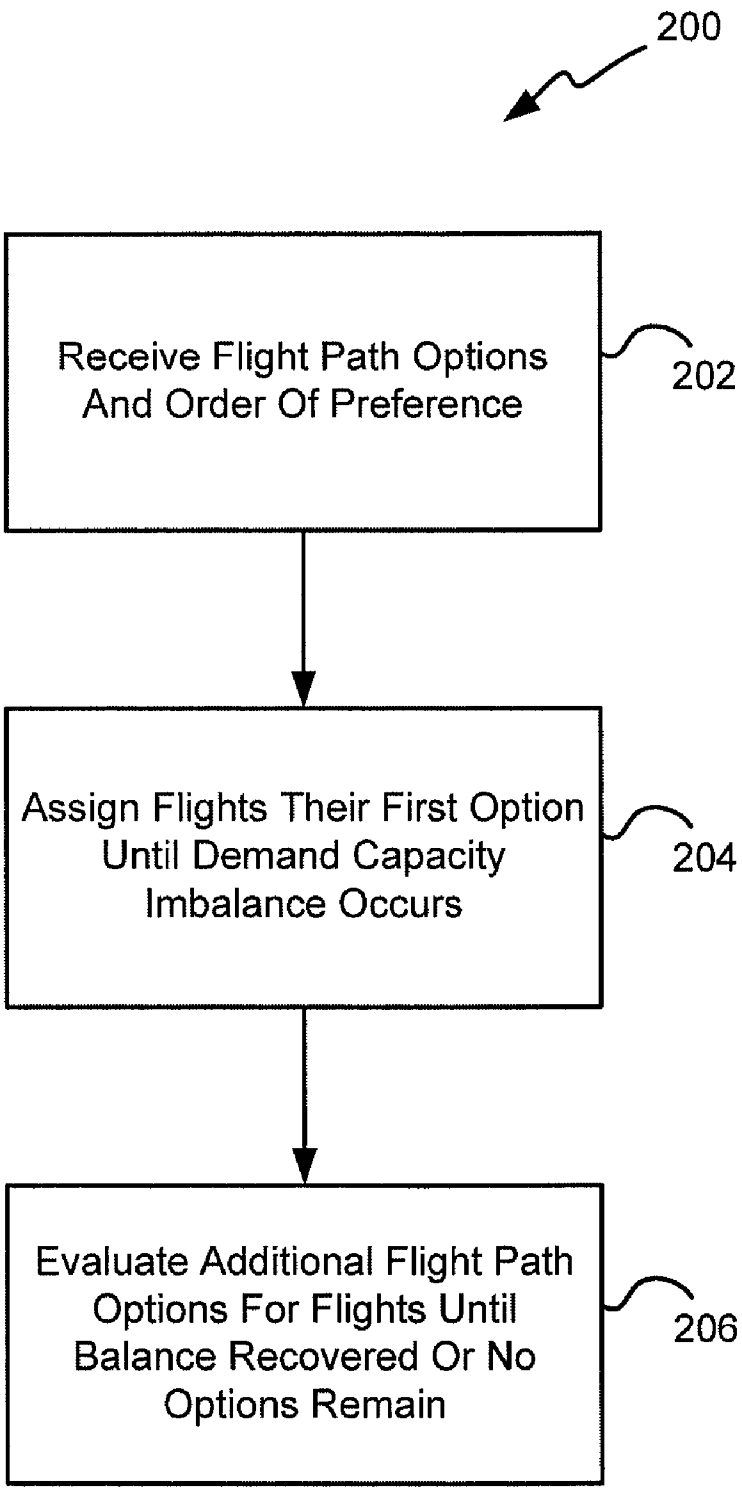
FIG. 2 is a flow chart showing one embodiment of a bottom-up heuristic method usable in the hybrid heuristic optimization process of the present invention.

In one example as shown in FIG. 2, a bottom-up heuristic method 200 involves receiving 202 one or more flight path options for each flight and an order of preference associated with the flight path options for each flight. The flights are assigned 204 their first flight path option until a demand capacity imbalance is calculated using the approximation model 130. After a demand capacity imbalance is calculated, one or more additional flight path options for the flights are evaluated 206 (using the approximation model 130) until demand capacity balance is recovered or there are no remaining flight path options.

Figure 3:
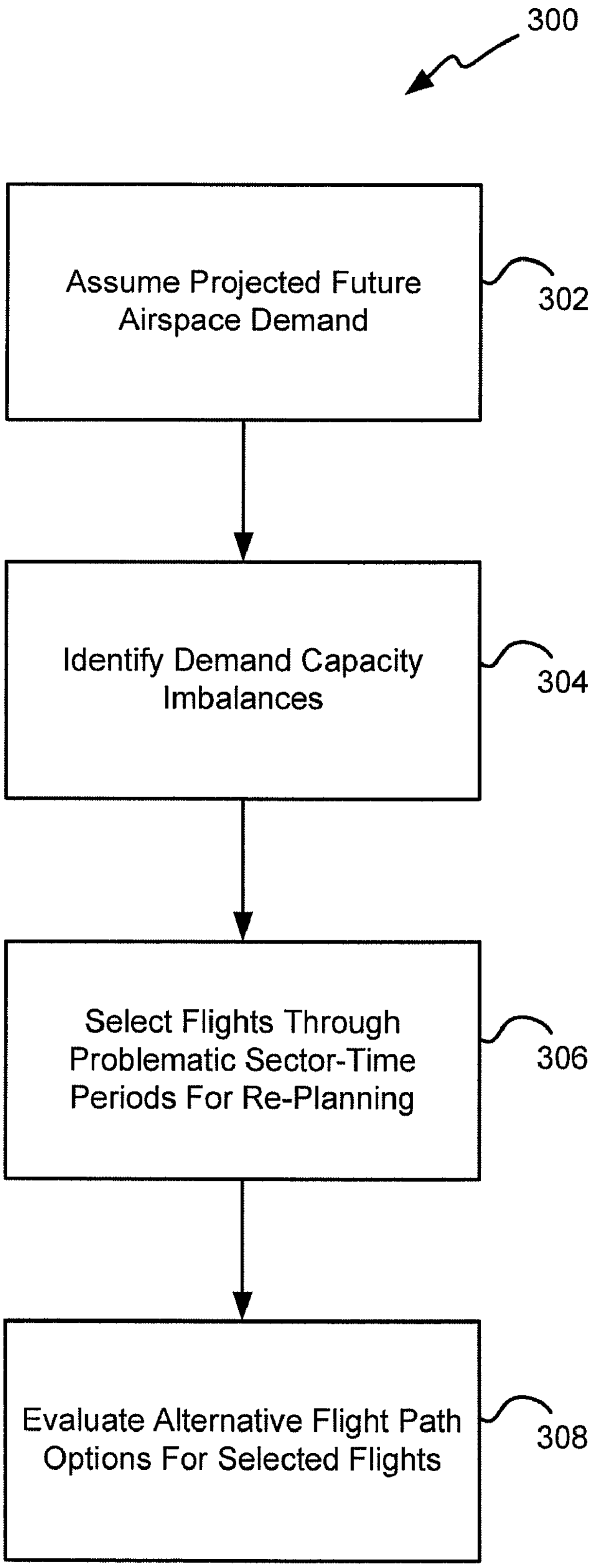
FIG. 3 is a flow chart showing one embodiment of a top-down heuristic method usable in the hybrid heuristic optimization process of the present invention.

In another example, as shown in FIG. 3, a top-down heuristic method 300 involves assuming 302 a projected future airspace demand. In this regard, the future airspace demand may include a plurality of sector-time periods in which the maximum number of aircraft traversing a particular sector in a given time period within an operational horizon is identified. Sector-time periods wherein demand capacity imbalances occur within the projected future airspace demand are identified 304. Flights that fly through problematic sector-time periods are selected 306 for re-planning. Alternative flight path options for the selected flights are then evaluated 308. In this regard, the alternative flight path options may be evaluated 308 based upon a contribution of each flight path option to the identified demand capacity imbalance.

Referring to FIGS. 4A-4D, in one embodiment the approximation model 130 is a data structure comprised of four-dimensional (4-D) traffic information. The air traffic control system is complicated not only in the high dimensionality (e.g., the number of flights and sectors involved) but also in the strong correlation among flights and sectors, which is due to the limitation of space, time, and other resources. Due to the computational burden of simulation-in-the-loop planning and optimization, it is desirable that an approximation model 130 of the air traffic system be used in order to reduce the total number of simulations executed. The approximation model 130 allows for a more extensive and efficient search of the solution space.

Utilizing computational geometry, including four-dimensional (4-D) flight-sector crossings, a data structure can be generated from which all potential flight path scenarios for a specific set of flights can be evaluated. Ignoring the correlation among flights, this 4-D data structure can be used to predict the aggregate demand of a given flight portfolio. That is, one can calculate the traffic demand at each sector during a certain time period as the total number of flights whose adopted route option crosses this sector during that period. Obtained is a two-dimensional matrix whose rows (or columns) correspond to sectors and columns (or rows) correspond to continuous time periods. For example, suppose each column corresponds to a fifteen-minute interval; then one will have 96 columns for a simulation period of 24 hours. This demand matrix can become more accurate if a smaller interval is used; e.g., there will be 480 columns if one adopts a three-minute interval. The demand matrix corresponding with the longer interval is referred to as the coarse-grained demand matrix and the demand matrix corresponding with the shorter interval is referred to as the fine-grained demand matrix. Of course, the intervals used for the coarse-grained and fine-grained demand matrices may vary from the respective fifteen-minute and three-minute periods described herein.

Figures 4A, 4B, 4C, 4D:
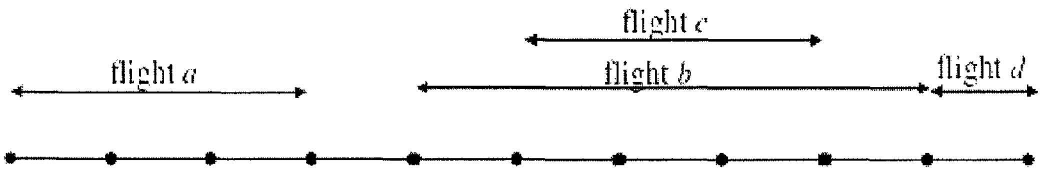
FIG. 4A is a plot representing an exemplary four-dimensional air traffic information set for a particular sector of interest.
FIG. 4B is an exemplary fine-grained demand matrix generated directly from the four-dimensional air traffic information set of FIG. 4A.
FIG. 4C is an exemplary coarse-grained demand matrix generated directly from the four-dimensional air traffic information set of FIG. 4A.
FIG. 4D is an exemplary coarse-grained demand matrix calculated as a function of the fine-grained demand matrix of FIG. 4B.

FIG. 4A is plot showing a portion of an exemplary 4-D traffic information set. The plot of FIG. 4A graphically depicts which of ten time intervals during which four exemplary flights (flight a, flight b, flight c and flight d) cross a particular sector of interest. The 4-D traffic information set can be represented by similar plots for all of the sectors of interest within the airspace. In the example of FIG. 4A, 'flight a' crosses the sector during the first three time intervals, 'flight b' crosses the sector during time intervals five through nine, 'flight c' crosses the sector during time intervals six through eight, and 'flight d' crosses the sector during the tenth time interval.

The fine-grained demand matrix of the approximation model 130 may be generated directly from the 4-D traffic information set. In this regard, FIG. 4B shows the fine-grained demand matrix for the sector of interest represented by the plot of FIG. 4A. The demand value for each interval in the fine-grained demand matrix is the number of flights that cross the sector during that interval.

The coarse-grained demand matrix may be obtained in more than one manner. As with the fine-grained demand matrix, the coarse-grained demand matrix may be generated directly from the 4-D traffic information set. In this regard, FIG. 4C shows a coarse-grained demand matrix for the sector of interest represented by the plot of FIG. 4A where the time-period of interest is divided into two intervals. In the case of FIG. 4C, the demand value for each of the two intervals in the coarse-grained demand matrix of FIG. 4B is the number of flights that cross the sector during that interval (e.g., flights a and b for the first interval and flights b, c and d during the second interval).

Another manner of generating the coarse-grained demand matrix is to calculate it from the fine-grained demand matrix. In this regard, FIG. 4D, shows a coarse-grained demand matrix for the sector of interest represented by the plot of FIG. 4A where the time-period of interest is divided into two intervals. In the case of FIG. 4D, each element of the coarse-grained demand matrix is calculated as a function of corresponding elements in the fine-grained demand matrix. By way of example, the function employed may be a maximum value function. In this example, for the first interval of the coarse-grained demand matrix, the element is calculated as the maximum value (e.g., 1) of the first five shorter time intervals in the fine-grained demand matrix, and for the second interval of the coarse-grained demand matrix, the element is calculated as the maximum value (e.g., 2) of the second five shorter time intervals in the fine-grained demand matrix. Other functions such as, for example, functions based upon the trajectories of flights within the sector can be used in place of or in combination with a maximum value function in calculating the coarse-grained demand matrix from the fine-grained demand matrix.

In the examples of FIGS. 4A-4D, the fine-grained and coarse grained demand matrices are depicted as having one row. This is because the exemplary 4-D traffic information set (represented by the plot of FIG. 4A) is for only one sector of interest. The 4-D traffic information set will, in general, be for more than one sector of interest, and the fine-grained and coarse-grained demand matrices will, in general, have as many rows as the number of sectors included in the 4-D traffic information set. Further, the 4-D traffic information set will, in general, encompass many fine and coarse time periods over the entire operational horizon, and the fine-grained and coarse-grained demand matrices will, in general, have as many columns as the respective number of fine and coarse time periods that comprise the operational horizon.

Figure 5:
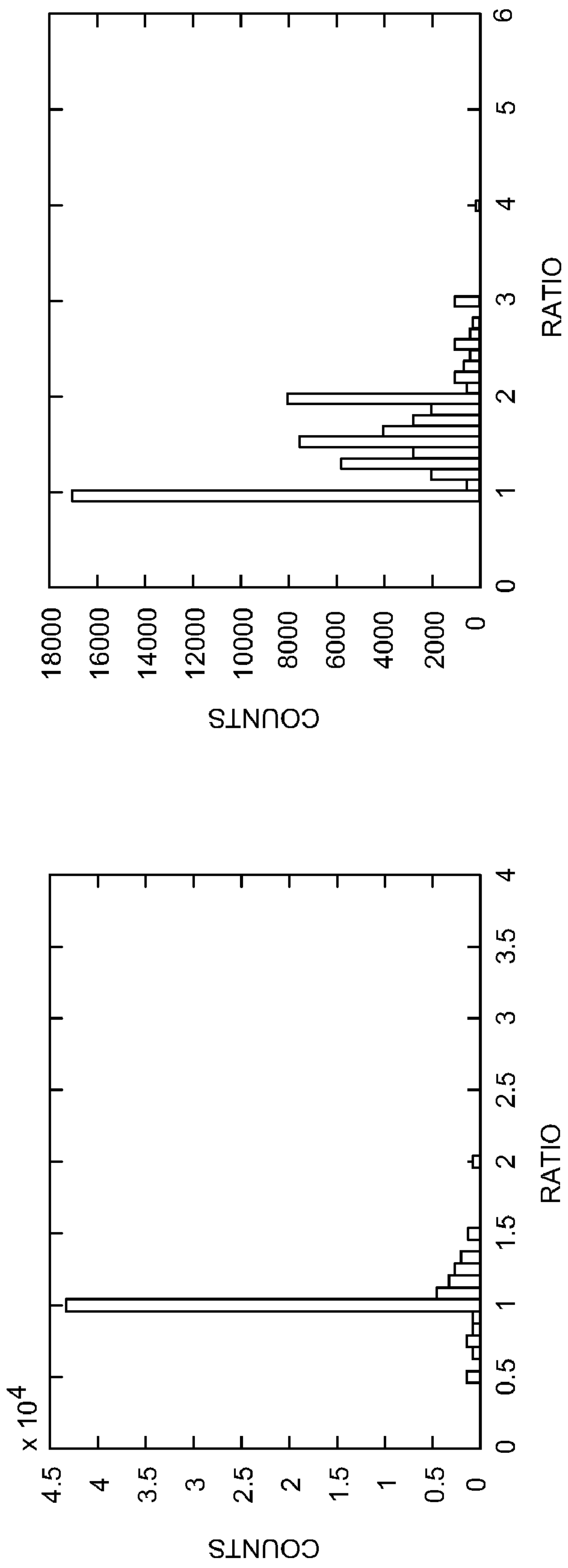
FIG. 5 is a histogram of the ratios between corresponding non-zero elements of a coarse-grained demand matrix and a simulator-generated demand matrix for an exemplary four-dimensional air traffic information set in which the left plot is for a coarse-grained demand matrix calculated as a function of a fine-grained demand matrix and the right plot is for a coarse-grained demand matrix generated directly from the four-dimensional air traffic information set.

It may be desirable to estimate the accuracy of the two coarse-grained demand matrices by comparing them with the demand matrix generated by the CAISS simulator. As shown in the histograms of FIG. 5, the ratios between the corresponding non-zero elements of the coarse-grained demand matrix and the simulator-generated demand matrix are plotted using histograms. It is clear that the coarse-grained demand matrix generated from the fine-grained matrix provides a much more accurate approximation to the simulator-generated demand, as the majority of the ratios are close or equal to 1. The other coarse-grained matrix, however, significantly over-estimates the simulator-generated demand. In this case, the ratios are usually much larger than 1 and the mean of the ratios is as high as 1.54, indicating a 54% over-estimation.

Figure 6:
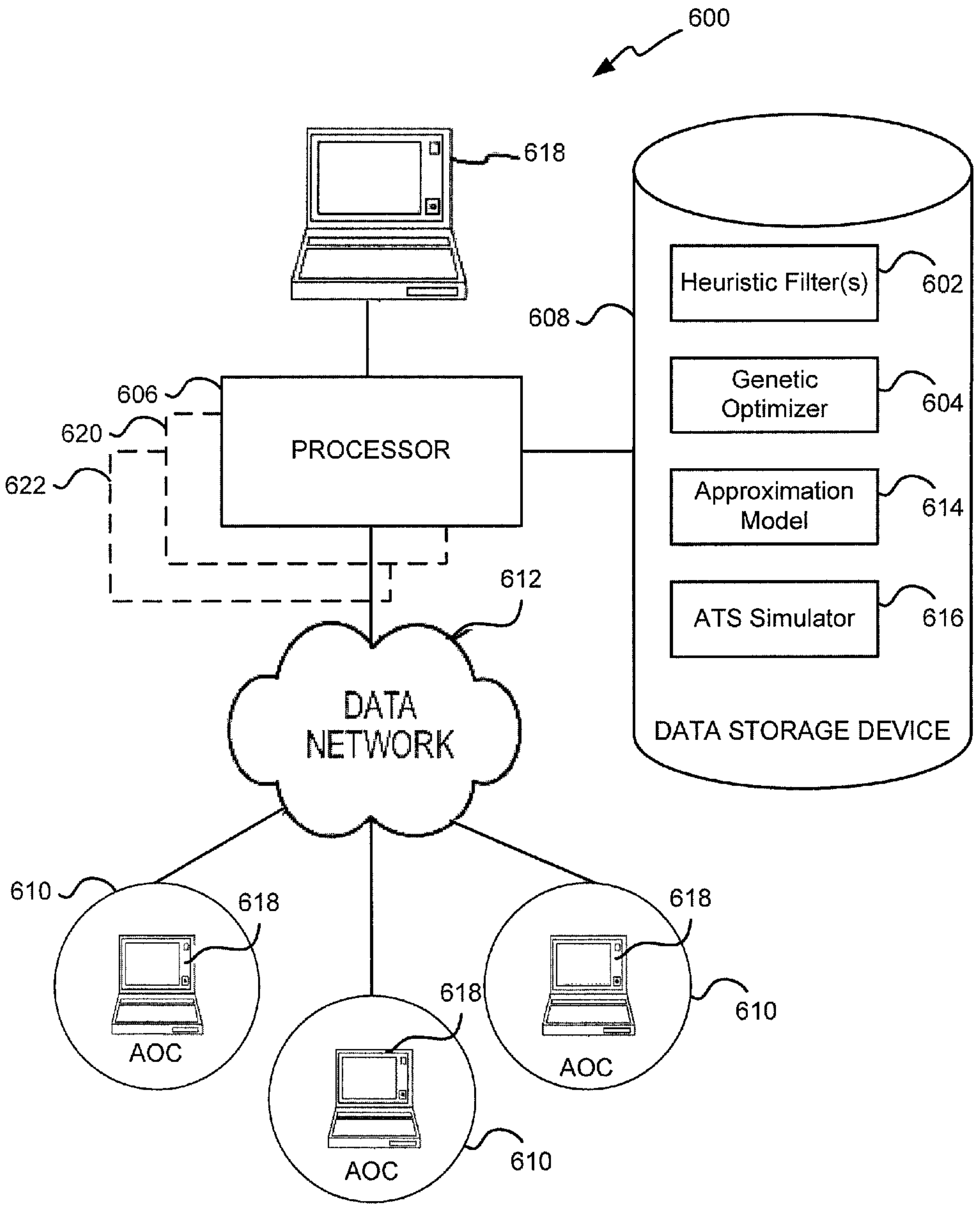
FIG. 6 is a block diagram of one embodiment of a system that optimizes competing portfolios of flight paths for flights through one or more sectors of an airspace.

FIG. 6 depicts one embodiment of a system 600 that optimizes competing portfolios of flight paths for flights through one or more sectors of an airspace. The system 600 of FIG. 6 includes a one or more heuristic filters 602 and a genetic optimizer 604. As illustrated, the system 600 may include one or more computer processor(s) 606, 620, 622 and a data storage device 608 that can be accessed by the computer processor 606. The heuristic filter(s) 602 and genetic optimizer 604 may be implemented in computer readable program code executable by the computer processor 606 and stored on the data storage device 608. Information defining the competing portfolios of flight paths may be receivable by the system 600 from one or more AOCs 610 via, for example, a data network 612.

The one or more heuristic-based filters 602 construct successive portfolios of the flight paths for consideration (e.g., from the information received from the AOCs 610). In this regard, the heuristic-based filter(s) include(s) one or more configurable parameters that are applied in selecting the successive portfolios. The genetic optimizer 604 identifies the heuristic-based filter(s) according to their one or more configurable parameters.

The system 600 also includes an approximation model 614 of the air traffic system. The approximation model 614 may be implemented in computer readable program code executable by the computer processor 606 and stored on the data storage device 608. The approximation model 614 is used to evaluate each successive portfolio constructed by the at least one heuristic-based filter. In this regard, the approximation model 614 may include fine-grained and coarse-grained demand matrices such as described in connection with FIGS. 4A-4D. Results of the evaluations of each successive portfolio by the approximation model 614 are used to select an optimal portfolio of the flight paths from among the plurality of competing portfolios of flight paths.

The system may also include a simulation 616 (e.g., the CAISS simulator) of the air traffic system. The simulation model 616 may be implemented in computer readable program code executable by the computer processor 606 and stored on the data storage device 608. The simulation model 616 is sued to validate the optimal portfolio of flight paths selected in accordance with results of the evaluations of each successive portfolio by the approximation model 614.

Once selected and validated by the system 600, the optimal portfolio (or information identifying the flight paths included in the optimal portfolio) may be output by the system 600 on one or more output device(s) 618 in communication with the computer processor 606. As shown, one or more of the output devices 618 may be located remotely from the computer processor 606 (e.g., located at a AOC 610) and accessed via the data network 612.

Although FIG. 6 depicts the various elements of the system 600 implemented in the context of a single computer processor, it is also possible to implement various components of the system 600 in the context of a multiprocessor computing environment or a distributed computing environment. In this regard, a portion or the entirety of the computer program code may be simultaneously executable on more than one computer processor of the multiprocessor computing environment or the distributed computing to implement parallel instantiations of one or more of the heuristic-based filter(s) 602, the genetic optimizer 604, the approximation model 614, and the simulation 616. For example, FIG. 6 depicts two processors 620, 622 shown in dashed lines in addition to processor 606 that may be included as part of a multiprocessor or distributed computing environment implementation of system 600. Multiprocessor or distributed computing environment implementations of system 600 may involve fewer or more than the three processors 606, 620, 622.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for optimizing a plurality of competing portfolios of flight paths for flights through one or more sectors of an airspace represented by an air traffic system, said method comprising:

executing computer program code on at least one computer processor to perform the steps of:

executing at least one heuristic-based process to construct successive portfolios of the flight paths for consideration, wherein the at least one heuristic-based process includes one or more configurable parameters that are applied in selecting the successive portfolios, and wherein the at least one heuristic-based process comprises at least one of a bottom-up heuristic method and a top-down heuristic method;

applying a genetic optimization process to identify the at least one heuristic-based process according to its one or more configurable parameters;

evaluating each successive portfolio constructed by the at least one heuristic-based process with an approximation model that approximates the air traffic system;

selecting an optimal portfolio of the flight paths from among the plurality of competing portfolios of flight paths based on results of said evaluating step; and utilizing a simulation of the air traffic system to validate the optimal portfolio of flight paths selected in said selecting step.

2. The method of claim 1 wherein said step of utilizing a simulation of the air traffic system comprises operating an air traffic simulator.

3. The method of claim 1 wherein said bottom-up heuristic method comprises:

receiving one or more flight path options for each flight and an order of preference associated with the flight path options for each flight;

assigning flights their first flight path option until a demand capacity imbalance is calculated using the approximation model; and after a demand capacity imbalance is calculated, evaluating one or more additional flight path options for the flights until demand capacity balance is recovered or there are no remaining flight path options.

4. The method of claim 1 wherein said top-down heuristic method comprises:

assuming a projected future airspace demand, wherein the future airspace demand includes a plurality of sector-time periods;

identifying sector-time periods wherein demand capacity imbalances occur within the projected future airspace demand;

selecting flights that fly through problematic sector-time periods for re-planning; and evaluating alternative flight path options for the selected flights based upon a contribution of each flight path option to the identified demand capacity imbalance.

5. The method of claim 1 wherein the one or more configurable parameters included in the at least one heuristic-based process include a heuristic-type and one or more threshold parameters.

6. The method of claim 1 further comprising:

outputting information identifying the flight paths included in the optimal portfolio on an output device in communication with the computer processor.

7. The method of claim 1 further comprising:

executing at least a portion of the computer program code in parallel within a multiprocessor computing environment or a distributed computing environment to perform at least one of said steps of executing at least one heuristic-based process, applying a genetic optimization process, evaluating each successive portfolio, and selecting an optimal portfolio, and utilizing a simulation of the air traffic system.

8. The method of claim 1 wherein the genetic optimization process comprises a multi-objective genetic optimization process.

9. A system that optimizes a plurality of competing portfolios of flight paths for flights through one or more sectors of an airspace represented by an air traffic system, said system comprising:

at least one computer processor; and computer readable program code executable by said computer processor, said computer readable program code implementing:

at least one heuristic-based filter that constructs successive portfolios of the flight paths for consideration, wherein the at least one heuristic-based filter includes one or more configurable parameters that are applied in selecting the successive portfolios, and wherein the at least one heuristic-based filter executes at least one of a bottom-up heuristic method and a top-down heuristic method;

a genetic optimizer that identifies the at least one heuristic-based filter according to its one or more configurable parameters;

an approximation model of the air traffic system that is usable to evaluate each successive portfolio constructed by the at least one heuristic-based filter, wherein results of the evaluations of each successive portfolio by the approximation model are used to select an optimal portfolio of the flight paths from among the plurality of competing portfolios of flight paths; and a simulation of the air traffic system usable to validate the optimal portfolio of flight paths selected in accordance with results of the evaluations of each successive portfolio by the approximation model.

10. The system of claim 9 wherein said simulation of the air traffic system comprises an air traffic simulator.

11. The system of claim 9 wherein, when said at least one heuristic-based filter executes a bottom-up heuristic method, said at least one heuristic-based filter receives one or more flight path options for each flight and an order of preference associated with the flight path options for each flight, assigns flights their first flight path option until a demand capacity imbalance is calculated using the approximation model, and, after a demand capacity imbalance is calculated, evaluates one or more additional flight path options for the flights until demand capacity balance is recovered or there are no remaining flight path options.

12. The system of claim 9 wherein, when said at least one heuristic-based filter executes a top-down heuristic method, said at least one heuristic-based filter assumes a projected future airspace demand that includes a plurality of sector-time periods, identifies sector-time periods wherein demand capacity imbalances occur within the projected future airspace demand, selects flights that fly through problematic sector-time periods for re-planning, and evaluates alternative flight path options for the selected flights based upon a contribution of each flight path option to the identified demand capacity imbalance.

13. The system of claim 9 wherein the one or more configurable parameters included in the at least one heuristic-based process include a heuristic-type and one or more threshold parameters.

14. The system of claim 9 further comprising:

an output device in communication with said at least one computer processor by which information identifying the flight paths included in the optimal portfolio is output.

15. The system of claim 9 wherein said at least one computer processor is included within a multiprocessor computing environment or a distributed computing environment and wherein at least a portion of the computer program code is simultaneously executable on at least one other processor of the multiprocessor computing environment or the distributed computing environment to implement parallel instantiations of at least one of said at least one heuristic-based filter, said genetic optimizer, said approximation model of the air traffic system, and said simulation of the air traffic system.

16. The system of claim 9 wherein the genetic optimization process comprises a multi-objective genetic optimization process.

* * * * *